United States Patent [19]

Sullivan

[11] Patent Number: 5,232,515
[45] Date of Patent: * Aug. 3, 1993

[54] WATER-REDUCIBLE COATING REMOVERS CONTAINING N-METHYL-2-PYRROLIDONE

[75] Inventor: Carl J. Sullivan, Exton, Pa.

[73] Assignee: ARCO Chemical Technology, L.P., Wilmington, Del.

[*] Notice: The portion of the term of this patent subsequent to Apr. 30, 2008 has been disclaimed.

[21] Appl. No.: 762,695

[22] Filed: Sep. 19, 1991

[51] Int. Cl.$^5$ .............................................. C23D 17/00
[52] U.S. Cl. ...................................... 134/38; 252/542; 252/DIG. 8
[58] Field of Search .................... 252/542, DIG. 8; 134/38

[56] References Cited

U.S. PATENT DOCUMENTS

| | | | |
|---|---|---|---|
| 4,120,810 | 10/1978 | Palmer | 252/153 |
| 4,664,721 | 5/1987 | Valasek | 252/542 X |
| 4,732,695 | 3/1988 | Francisco | 252/DIG. 8 X |
| 4,749,510 | 6/1988 | Nelson | 252/166 |
| 4,780,235 | 10/1988 | Jackson | 252/542 X |
| 4,812,255 | 3/1989 | Suwala | 252/142 |
| 4,836,950 | 6/1989 | Madsen et al. | 252/153 |
| 4,927,556 | 5/1990 | Pokorny | 252/173 |
| 5,006,279 | 4/1991 | Grobbel et al. | 252/542 |
| 5,011,621 | 4/1991 | Sullivan | 252/DIG. 8 X |
| 5,015,410 | 5/1991 | Sullivan | 252/DIG. 8 X |
| 5,024,780 | 6/1991 | Leys | 252/542 X |
| 5,035,829 | 7/1991 | Suwala | 252/170 |
| 5,049,300 | 9/1991 | Fusiak et al. | 252/162 |
| 5,049,314 | 9/1991 | Short | 252/542 |
| 5,073,287 | 12/1991 | Harelstad | 252/153 |

FOREIGN PATENT DOCUMENTS 0389829  10/1990  European Pat. Off. .
WO88/06640 9/1988  PCT Int'l Appl. .

*Primary Examiner*—Patrick P. Garvin
*Attorney, Agent, or Firm*—Jonathan L. Schuchardt

[57] ABSTRACT

Water-reducible coating removers are disclosed. The compositions comprise N-methyl-2-pyrrolidone, a glycol ether ester, a $C_1$–$C_8$ aliphatic alcohol, and a surfactant. The coating removers are suitable for stripping partially and fully dried alkyd, latex, and nitrocellulose coatings.

9 Claims, No Drawings

WATER-REDUCIBLE COATING REMOVERS CONTAINING N-METHYL-2-PYRROLIDONE

FIELD OF THE INVENTION

The invention relates to coating removers. Water-reducible, methylene chloride-free compositions suitable for removing partially dried paints, and fully dried alkyd, latex, and nitrocellulose coatings, are disclosed. The coating removers contain N-methyl-2-pyrrolidone, a glycol ether ester, an aliphatic alcohol, and a surfactant.

BACKGROUND OF THE INVENTION

Methylene chloride has long been used in paint strippers because it is inexpensive and highly effective. Because of concerns about the toxicity of methylene chloride, less-toxic, non-halogenated alternatives such as N-methyl-2-pyrrolidone, dibasic esters, and other solvents are replacing methylene chloride in paint strippers.

N-Methyl-2-pyrrolidone has been used in numerous methylene chloride-free formulations, including those described in U.S. Pat. Nos. 4,664,721, 4,836,950, 4,749,510, 4,780,235, 4,120,810, 4,732,695, 5,011,621, and 5,015,410. These formulations include substantial amounts of aliphatic or aromatic hydrocarbons, dibasic esters, or oils. Unfortunately, water rinsing of these coatings is not feasible because of the low water solubility of hydrocarbons, oils, and dibasic esters.

Water-rinsable compositions are taught in U.S. Pat. No. 4,927,556, in which diesters of $C_4$–$C_6$ dibasic acids are combined with water and a thickener. European Patent Application 0 389 829 teaches a water-reducible formulation that incorporates NMP, diesters of $C_4$–$C_6$ dibasic acids, glycol ethers, and a thickener. U.S. Pat. No. 5,006,279 teaches a water-reducible composition that includes NMP, aromatic solvents, a glycol ether, an alkanolamine, and a thickener. International Publication No. WO 88/06640 teaches a water-soluble paint remover containing NMP, a glycol ether, and an organic acid. U.S. Pat. No. 5,024,780 teaches a graffiti remover comprising NMP, propylene carbonate, a glycol ether acetate, isocetyl alcohol, a thickener, and a surfactant.

Although these compositions are water-rinsable, they suffer from a number of drawbacks. Dibasic esters are a potential health hazard, as indicated by their low permissible exposure limit (PEL) of 10 ppm. Organic acids are corrosive. Isocetyl alcohol is expensive. Many aromatic hydrocarbons evaporate easily and aggravate lower atmosphere ozone problems. In addition, compositions containing substantial amounts of aromatic hydrocarbons or dibasic esters often phase separate during storage. Performance of many water-rinsable compositions previously developed is also somewhat poorer than desirable for many types of coatings, including cured enamels, two-part polyurethanes, and nitrocellulose lacquers.

SUMMARY OF THE INVENTION

The invention is a water-reducible coating remover composition. The composition comprises N-methyl-2-pyrrolidone, a glycol ether ester, a $C_1$–$C_8$ aliphatic alcohol, and a surfactant. Optional additives include water, thickeners, solvents, rust inhibitors, and accelerators. These methylene chloride-free, water-reducible compositions effectively remove partially dried paints such as automotive enamels, as well as fully dried alkyd, latex, and nitrocellulose lacquers.

DETAILED DESCRIPTION OF INVENTION

N-methyl-2-pyrrolidone (NMP) is an essential component in the coating removers of the invention. Although any amount of NMP may be used, at least about 10 weight percent is preferred for desirable efficacy. Since NMF is relatively expensive, it is desirable to use not more than about 60 weight percent in the composition. Thus, an amount of NMP within the range of about 10 to about 60 weight percent is preferred. More preferred is the range from about 10 to about 35 weight percent.

A glycol ether ester is a second essential component. Suitable glycol ether esters are derived from $C_1$–$C_4$ ethers of $C_1$–$C_9$ glycols and $C_1$–$C_6$ carboxylic acids. Preferred glycol ether esters are the glycol ether acetates. Acetate esters of ethylene glycol ethers, diethylene glycol ethers, triethylene glycol ethers, propylene glycol ethers, dipropylene glycol ethers, tripropylene glycol ethers, and the like, and mixtures thereof, are suitable. Specific examples of suitable glycol ether esters include, but are not limited to, ethylene glycol n-butyl ether acetate, propylene glycol n-butyl ether acetate, propylene glycol tert-butyl ether propionate, tripropylene glycol methyl ether acetate, diethylene glycol ethyl ether acetate, dipropylene glycol methyl ether acetate, and the like.

Any desired amount of glycol ether ester may be used. It is preferred to use an amount within the range of about 20 to about 70 weight percent. A more preferred range is from about 20 to about 50 weight percent.

A third required component is a $C_1$–$C_8$ aliphatic alcohol. The aliphatic alcohol may be linear, branched or cycloaliphatic. Suitable examples include methanol, ethanol, n-propanol, isopropanol, n-butyl alcohol, sec-butyl alcohol, t-butyl alcohol, isobutyl alcohol, 2-pentyl alcohol, cyclopentyl alcohol, n-hexyl alcohol, cyclohexanol, n-octyl alcohol, and the like, and mixtures thereof. Especially preferred are $C_2$–$C_4$ aliphatic alcohols because they enhance the water rinsability of the formulation and are relatively inexpensive. Methanol is also less preferred because of its relatively high toxicity.

Any amount of $C_1$–$C_8$ aliphatic alcohol may be used, but it is preferred to use an amount within the range of about 0.2 to about 20 weight percent. Particularly preferred is an amount within the range of about 1 to about 10 weight percent. Most preferred is the range from about 2 to about 5 weight percent.

Surprisingly, the alcohol is a critical, albeit a minor, component in the compositions of the invention. Without the alcohol, the compositions tend to phase separate quickly after formulation. Such phase separation is unacceptable because the formulations must be capable of prolonged storage. The alcohol appears to act as a miscibilizing solvent. In addition, it is believed that the alcohol functions as a co-surfactant, and improves the water rinsability of the formulation.

A fourth required component in the coating removers of the invention is a surfactant, which is preferably used in an amount within the range of about 0.1 to about 10 weight percent, more preferably within the range of about 1 to about 5 weight percent. The surfactant improves wetting of the painted surface, accelerates penetration of essential stripper components into the partially or fully cured coating, and increases the shelf life of the composition. The surfactant also helps to emulsify non-water-soluble components (such as stripped paint) during rinsing with water. Anionic, cationic, nonionic, and amphoteric surfactants, and combinations thereof, may be used. The best surfactant for a particular application depends on the composition and on the intended application. Examples of suitable surfactants include, but are not limited to, polyoxyethylene derivatives of aromatic and aliphatic alcohols, alkali metal salts of $C_8$–$C_{22}$ aliphatic sulfates, alkali metal salts of alkyl aromatic sulfonates, dialkyl sulfosuccinates, and the like. Products such as "Calsoft L-60" surfactant (Pilot Chemical Co.) and "Igepal CO-530" surfactant (GAF) are suitable. Examples of other suitable surfactants are described in Cahn et al., "Surfactants and Detersive Systems," Kirk-Othmer, *Encyclopedia of Chemical Technology*, 3rd. Ed., (1983) Vol 22, pp. 332–432, and also in *McCutcheon's Emulsifiers and Detergents*, 1989 North American Edition, pp. 260–284.

Other solvents are optionally included in the compositions of the invention, most often to improve solubility, modify performance, or optimize cost. Some of these function as miscibilizing solvents, while others, such as carboxylic acids, may accelerate stripping. Preferably, the optional solvents are miscible with water, although this is not a requirement. Examples of solvents that may be used include aliphatic and aromatic hydrocarbons, terpenes, alcohols, glycols, carboxylic acids, aminoalcohols, nitriles, ketones, esters, ethers, glycol ethers, glycol ether esters, and mixtures thereof.

Thickeners are optional components in the compositions of the invention, and are typically used to control rheological properties of the coating remover. The amount of thickener used depends on the application and on the desired viscosity. Painton applications can require a broad range of viscosities, while a soak-tank application may require no thickener. Typically, the amount used is within the range of about 0.1 to about 15 weight percent. Suitable thickeners include, but are not limited to, alkylated, esterified, and oxyalkylated cellulose derivatives, (e.g., ethyl cellulose, cellulose acetate butyrate, hydroxypropyl cellulose, and the like), organoclays, fatty acid salts, fumed silica, paraffinic waxes, polyvinyl alcohol, and the like. Products such as "Klucel H" thickener (Aqualon Co.) are suitable.

Other optional additives that may be included are conventional rust inhibitors and accelerators. These are typically used in an amount within the range of about 0.1 to about 10 weight percent.

An advantage of the compositions of the invention is that they can be diluted with any desired amount of water to produce more economical compositions. Usually, it will be desirable to maximize the amount of water yet still maintain good stripping performance properties. Difficult stripping jobs may require compositions having little to no water content, while less challenging stripping jobs may tolerate a considerable amount of added water. Although any amount of water can be added, it is preferred to use an amount within the range of about 5 to about 70 weight percent, more preferably within the range of about 30 to about 50 weight percent.

Conventional paints such as nitrocellulose lacquers, latex paints, partially dried baking enamels, and partially cured polyurethane enamels can be removed with the compositions of the invention. Other coatings that can be removed include alkyd and acrylic enamels, polyesters, epoxy resin coatings, polyvinyls, polyvinyl cinnamates, polyamides, polyimides, oil-base paints, shellacs, phenolic coatings, gum varnishes, silicone coatings, polyalkyl acrylates, polyalkyl methacrylates, drying oils, polyvinyl acrylates, and the like. The substrate from which the coating is removed may be of any material that is reasonably resistant to the coating remover, such as wood, glass, thermoset resin, thermoplastic resin, or metal. The coated substrate may be treated with the coating remover by any suitable method, including brushing, spraying, or immersion. The treatment is most conveniently performed at room temperature, but lift time may be shortened in some cases by heating the coating remover and/or substrate. The compositions of the invention have relatively low volatility, and can be used if desired at elevated temperatures without significant solvent evaporation.

The coated substrate is typically allowed to remain in contact with the stripper until the coating is substantially lifted from the substrate. The loosened coating can then be removed by mechanical action (i.e., scraping or sanding) or by rinsing with high-pressure water or air.

The method by which the components of the coating remover are combined is not critical. Mixing can be accomplished by blending with a mechanical mixer in a tank or similar vessel.

The following examples merely illustrate the invention. Those skilled in the art will recognize numerous variations that are within the spirit of the invention and scope of the claims.

Paint Systems studied

1) A high-solids, black, melamine-acrylic baking enamel used for automotive applications.

2) A high-solids, white, melamine-acrylic baking enamel used for automotive applications.

3) A two-part polyurethane coating: an Imron 333 coating system used for automotive applications.

4) Nitrocellulose lacquer coating, blue, system used to coat a set of pencils.

5) Painted wood siding from a house. Multi-layer, well-aged coatings of latex and alkyd paints of unknown origin.

Performance Testing

The automotive paints (1–3 above) were applied to untreated, cold-rolled steel, and the panels were aged for either 20 hours or 4 days prior to testing. Spots of stripper compositions were applied to panels laid flat (horizontally). After 15 minutes, the panels were wiped clean, and the percent paint removed was estimated. Values of >90% represent excellent performance.

To test strippers on the nitrocellulose coatings, the test solutions were applied to the pencil and allowed to sit for 5 min, after which time the pencil was wiped clean with a paper towel. Relative performance was rated based on how much blue lacquer was removed and how much bare wood showed through on the pencil.

Removal of paint from the wooden siding was tested by applying small spots of coating remover to the siding and allowing them to sit overnight. Following the overnight soak period, the softened paint was scraped free.

COMPARATIVE EXAMPLES 1–8

Table 1 shows the compositions of the stripper formulations used as comparative examples.

The composition used for Comparative Example 1 (see Table 1) contained NMP, water, dipropylene glycol methyl ether, a thickener, and dibasic esters. This composition is similar to those described in EP 0 389 829. As shown in Table 3, this formulation phase separated immediately after preparation, and was considered to be unacceptable for use as intended.

The composition used for Comparative Example 2 contained NMP, water, tripropylene glycol methyl ether, "Aromatic 100" solvent blend, a thickener, and ethanolamine. This composition is similar to what is described in U.S. Pat. No. 5,006,279. The product described in the reference (Example 1) is a milky-white mixture, and is obtained following a complicated blending procedure. In our case, the reagents were simply combined and mixed well. The mixture rapidly separated into two phases, and was not considered to be useful for testing.

For Comparative Example 3, a stripper commercially available from 3M Company known as "Safest Stripper" was used. The composition of this stripper is similar to what is described in U.S. Pat. No. 4,927,556. The coatings tested were the nitrocellulose lacquers and the multi-layer coated wood siding. As shown in Table 4, this stripper was not effective for the nitrocellulose lacquer coating. The wood siding samples were soaked in this stripper overnight. The top two layers were easily scraped off the next day. Two reapplications of the stripper in the same manner were ineffective for removal of the well-aged, underlying paint layers.

For Comparative Example 4, a methylene chloride-based stripper known as "Zip Strip," which is commercially available from Star Bronz Company, was used. When applied to the multilayer coating and allowed to work overnight, very little paint was removed because the stripper evaporated completely and the coating re-adhered to the siding. When applied and allowed to soak for only 1 to 1.5 h, however, the first several layers of paint were easily removed by scraping. Three applications of the stripper in this way allowed complete removal of the paint (see Table 4).

Comparative Examples 5-8 are compositions similar to those of the invention, but without the aliphatic alcohol component. Three of the four examples (C5, C7, and C8) phase separated soon after the reagents were combined, and were deemed unacceptable for commercial use. These formulations were tested anyway on the coated panels. The performance of these compositions is shown in Table 3. The performance of compositions C5-C8 was generally satisfactory to excellent, but the phase stability problem, which was apparent even when the mixtures were shaken and used immediately for testing, gives these compositions no hope of marketability.

EXAMPLES 9-25

The composition of Example 9 was tested on the nitrocellulose lacquers and on the coated wooden siding. Good performance was noted in each case (Table 4). Almost all of the paint was removed from the wooden siding after three overnight applications. While this stripper works somewhat more slowly than the methylene chloride-based composition, the latter requires more attention and early removal. For large jobs, such as commercial renovations, longer useful working times, which are provided by the compositions of the invention, are an important advantage.

Compositions 9-25, summarized in Table 2, are compositions of the invention. Almost all of the compositions tested were effective in removing 20-hour-old black enamel, white enamel, and polyurethane coatings. Most of the compositions were also quite effective for the 4-day-old films. Even compositions diluted to 50 weight percent water content were generally effective in removing the coatings tested. None of these compositions exhibited the phase-stability problems observed with similar formulations that did not include the aliphatic alcohol component (Comparative Examples C5–C8, Table 1).

Thus, highly effective, phase-stable, water-reducible coating remover compositions, which have previously been unavailable, are now provided with compositions that include NMP, a glycol ether ester, a $C_1$-$C_8$ aliphatic alcohol, and a surfactant.

TABLE 1

COATING REMOVER COMPOSITIONS
COMPARATIVE EXAMPLES

| Component (wt.) % | C1 | C2 | C3 | C4 | C5 | C6 | C7 | C8 |
|---|---|---|---|---|---|---|---|---|
| NMP | 30 | 26 | | | 24 | 33.5 | 12 | 17 |
| Water | 30 | 30 | | | 50 | 30 | 50 | 30 |
| PMAc | | | | | 24 | 33.5 | 36 | 50 |
| DPM | 15 | | | | | | | |
| TPM | | 26 | | | | | | |
| "Aromatic 100" | | 47 | | | | | | |
| DBE | 25 | | | | | | | |
| Ethanolamine | | 1.0 | | | | | | |
| "Igepal CO-530" | | | | | 1.5 | 2.1 | 1.5 | 2.1 |
| "Klucel H" | 1.0 | 1.0 | | | 0.5 | 0.7 | 0.5 | 0.7 |
| "Zip Strip" | | | | 100 | | | | |
| "Safest stripper" | | | 100 | | | | | |

NMP = N-methyl-2-pyrrolidone
PMAc = propylene glycol methyl ether acetate
DPM = dipropylene glycol methyl ether
TPM = tripropylene glycol methyl ether
DBE = dibasic esters
"Aromatic 100" solvent is a product of Exxon Chemical Co.
"Igepal CO-530" surfactant is a product of GAF
"Zip strip" is a product of Star Bronz Company
"Klucel H" thickener is a product of Aqualon Co.
"Safest stripper" is a product of 3M Company

TABLE 2

COATING REMOVER COMPOSITIONS OF THE INVENTION

COMPOSITION #

| Component (wt. %) | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|
| NMP | 32 | 23 | 32 | 23 | 16 | 12 | 32 | 23 | 32 | 23 | 23 | 32 | 32 | 12 | 12 | 16 | 16 |
| Water | 30 | 50 | 30 | 50 | 30 | 50 | 30 | 50 | 30 | 50 | 50 | 30 | 30 | 50 | 50 | 30 | 30 |
| n-Butanol | 3.5 | 2.5 | 3.5 | 2.5 | 3.5 | 2.5 | 3.5 | 2.5 | 3.5 | | | | | | | | |
| t-Butanol | | | | | | | | | | 2.5 | | 3.5 | | 2.5 | | 2.5 | |
| Ethanol | | | | | | | | | | | 2.5 | | 3.5 | | 2.5 | | 2.5 |
| PMAc | 32 | 23 | 32 | 23 | 48 | 34 | | | | 23 | 23 | 32 | 32 | 34 | 34 | 48 | 48 |
| DPMAc | | | | | | | 32 | 23 | 32 | | | | | | | | |
| "Calsoft L-60" | 2.1 | | | 1.5 | | | | | 2.1 | | | | | | | | |
| "Igepal CO-530" | | 1.5 | 2.1 | | 2.1 | 1.5 | 2.1 | 1.5 | | 1.5 | 1.5 | 2.1 | 2.1 | 1.5 | 1.5 | 2.1 | 2.1 |
| "Klucel H" | 0.7 | 0.5 | 0.7 | 0.5 | 0.7 | 0.5 | 0.7 | 0.5 | 0.7 | 0.5 | 0.5 | 0.7 | 0.7 | 0.5 | 0.5 | 0.7 | 0.7 |

TABLE 2-continued
COATING REMOVER COMPOSITIONS OF THE INVENTION

| Component (wt. %) | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|
| Gardner/Holt Viscosity | S | D/E | S | D | R | D/E | <A | <A | U/V | | | | | | | | |

NMP = N-methyl-2-pyrrolidone; PMAc = propylene glycol methyl ether acetate; DPMAc = dipropylene glycol methyl ether acetate
"Calsoft L-60" surfactant is a product of Pilot Chemical Co.
"Igepal CO-530" surfactant is a product of GAF
"Klucel H" thickener is a product of Aqualon Co.

TABLE 3
PERFORMANCE OF COATING REMOVERS

| COMPO-SITION # | % Removal of 20-hour-old films | | | % Removal of 4-day-old films | |
|---|---|---|---|---|---|
| | BE | WE | PU | BE | WE |
| C1 | * | * | * | * | * |
| C2 | * | * | * | * | * |
| C5** | >90 | 50 | 10 | 10 | 0 |
| C6 | >90 | 50 | 70 | >90 | 0 |
| C7** | >90 | 80 | 80 | >90 | 20 |
| C8** | >90 | >90 | >90 | >90 | >90 |
| 9 | >90 | >90 | >90 | 80 | 80 |
| 10 | >90 | 50 | 70 | >90 | 70 |
| 11 | >90 | >90 | >90 | >90 | 70 |
| 12 | >90 | >90 | 80 | >90 | >90 |
| 13 | >90 | >90 | >90 | >90 | >90 |
| 14 | >90 | >90 | >90 | >90 | >90 |
| 15 | >90 | >90 | >90 | >90 | >90 |
| 16 | >90 | >90 | >90 | >90 | 10 |
| 17 | >90 | >90 | 90 | >90 | 0 |
| 18 | 90 | 10 | 0 | 20 | 10 |
| 19 | 0 | 30 | 10 | 90 | 0 |
| 20 | >90 | 20 | 90 | 90 | 60 |
| 21 | >90 | 20 | 40 | >90 | 80 |
| 22 | >90 | 80 | 80 | 80 | 10 |
| 23 | >90 | 90 | 80 | >90 | 40 |
| 24 | >90 | 80 | >90 | >90 | 60 |
| 25 | >90 | >90 | >90 | >90 | 60 |

*Composition quickly formed two-phase mixture and was not tested
**Two-phase mixture was shaken and used immediately-phase separated during test
BE = Black enamel; WE = White enamel; PU = polyurethane

TABLE 4
PERFORMANCE OF COATING REMOVERS

| COMPOSITION # | Removal ratings | |
|---|---|---|
| | Multi-layer Coat[1] | Nitrocellulose lacquer[2] |
| C3* | poor | poor |
| C4** | good | not tested |
| 9 | good | good |

*"Safest stripper" (product of 3M Company)
**"Zip strip" (product of Star Bronz Company)
[1]Multi-layer, well-aged, latex and alkyd coatings of unknown origin-wooden siding from a house. Three applications of stripper were used.
[2]Set of identical pencils coated with blue nitrocellulose lacquer.

I claim:

1. A water-reducible coating remover composition comprising:
   (a) from about 10 to about 60 weight percent of N-methyl-2-pyrrolidone;
   (b) from about 20 to about 70 weight percent of a glycol ether acetate;
   (c) from about 0.2 to about 20 weight percent of a $C_1$–$C_8$ aliphatic alcohol;
   (d) from about 0.1 to about 10 weight percent of a surfactant; and
   (e) up to about 70 weight percent of water.

2. The composition of claim 1 wherein the glycol ether acetate is derived from a $C_1$–$C_4$ ether of a $C_1$–$C_9$ glycol and acetic acid.

3. The composition of claim 1 wherein the glycol ether acetate is an acetate ester of a glycol ether selected from the group consisting of ethylene glycol ehters, diethylene glycol ethers, triethylene glycol ethers, propylene glycol ethers, dipropylene glycol ethers, and tripropylene glycol ethers.

4. The composition of claim 1 including up to about 15 weight percent of a thickener.

5. A water-reducible coating remover composition comprising:
   (a) from about 10 to about 35 weight percent of N-methyl-2-pyrrolidone;
   (b) from about 20 to about 50 weight percent of a glycol ether acetate;
   (c) from about 1 to about 10 weight percent of a $C_1$–$C_8$ aliphatic alcohol;
   (d) from about 30 to about 50 weight percent of water; and
   (e) from about 1 to about 5 weight percent of a surfactant.

6. The composition of claim 5 wherein the glycol ether acetate is derived from a $C_1$–$C_4$ ether of a $C_1$–$C_9$ glycol and acetic acid.

7. The composition of claim 5 wherein the glycol ether acetate is an acetate ester of a glycolether selected from the group consisting of ethylene glycol ethers, diethylene glycol ethers, triethylene glycolethers, propylene glycol ethers, dipropylene glycolethers, and tripropylene glycolethers.

8. The composition of claim 5 including up to about 15 weight percent of a thickener.

9. A method for removing a coating from a substrate comprising applying the composition of claim 6 to a coated substrate, allowing the substrate and the coating remover to remain in contact until the coating is loosened, and rinsing the loosened coating from the substrate with water.

* * * * *